United States Patent
Bates et al.

(10) Patent No.: US 10,481,962 B2
(45) Date of Patent: Nov. 19, 2019

(54) METHOD FOR DATA DISASTER RECOVERY ASSESSMENT AND PLANNING

(75) Inventors: John W. Bates, Mendon, MA (US); Nicos Vekiarides, Natick, MA (US); Brian Geisel, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1725 days.

(21) Appl. No.: 12/473,524

(22) Filed: May 28, 2009

(65) Prior Publication Data
US 2009/0300409 A1     Dec. 3, 2009

Related U.S. Application Data

(60) Provisional application No. 61/057,638, filed on May 30, 2008.

(51) Int. Cl.
*G06F 11/00* (2006.01)
*G06Q 10/06* (2012.01)

(52) U.S. Cl.
CPC ....... *G06F 11/008* (2013.01); *G06Q 10/0635* (2013.01)

(58) Field of Classification Search
CPC .................. G06F 11/008; G06Q 10/0635
USPC ............................................. 705/7.28
See application file for complete search history.

(56) References Cited

U.S. PATENT DOCUMENTS

| 6,584,501 B1 | 6/2003 | Cartsonis et al. |
|---|---|---|
| 6,831,668 B2 * | 12/2004 | Cras et al. ............... 715/853 |
| 7,159,184 B2 | 1/2007 | Ullah et al. |
| 7,246,254 B2 | 7/2007 | Alur et al. |
| 7,360,123 B1 | 4/2008 | Westenberg et al. |
| 7,380,214 B1 | 5/2008 | Giormov |
| 2005/0027571 A1 | 2/2005 | Gamarnik et al. |
| 2005/0137932 A1 | 6/2005 | D'Angelo et al. |
| 2006/0047626 A1 | 3/2006 | Raheem |
| 2007/0078861 A1 | 4/2007 | Aidun |
| 2007/0192236 A1 | 8/2007 | Futch et al. |
| 2007/0226016 A1 | 9/2007 | Gross et al. |

OTHER PUBLICATIONS

Brooks et al., Disaster Recovery Solutions for IBM TotalStorage SAN File System, IBM Redbooks, Jan. 2006.*

(Continued)

*Primary Examiner* — Nadja N Chong Cruz
(74) *Attorney, Agent, or Firm* — Krishnendu Gupta; Jason Reyes; Anne-Marie Dinius

(57) ABSTRACT

A method for assessing the risk and cost for data loss and disaster recovery (DR) plans includes providing an application having a graphical user interface (GUI) comprising first and second windows arranged adjacent to each other. The first window comprises a catalog of components used to generate data disaster recovery (DR) configurations and the second window displays the generated DR configurations. A first DR configuration is generated in the second window and components are added to the first DR configuration by dragging and dropping components from the catalog into appropriate locations of the second window. Metrics for the first DR configuration are calculated and reported in the second window. A second configuration is also similarly generated in the second window and the metrics results are graphically compared to each other.

13 Claims, 22 Drawing Sheets

(56) References Cited

OTHER PUBLICATIONS

Richard Jones, Survival of the Fittest: Disaster Recovery Design for the Data Center, Data Center Strategies, In-Depth Research Overview, Burton Group, Sep. 10, 2007.*
Tim Read, Architecting Availability and Disaster Recovery Solutions, Sun BluePrintsTM Online, Apr. 2006.*
Paul Tallet, Drag and drop, cut/copy and paste files with Windows Explorer, The Code Project, Your Development Resource, May 9, 2006.*
Brooks et al., Disaster Recovery Strategies with Tivoli Storage Management, IBM Redbooks, Nov. 2002.*
Citrix Access Suite 4.0, Disaster Recovery Planning and Configuration, Citrix, Sep. 2005.*
Ravi Chalaka, "Simplifying disaster recovery solutions to protect your data", Computer Technology Review, Dec. 2003.
US Datatrust, "Data Disaster Recovery for Small to Mid-Sized Businesses", www.usdatatrust.com 2002-2004 Live Corporation Vault.

* cited by examiner

200

Assessment of Company' Data Infrastructure 210

Sites, components, enclosures
Application workloads/tiers and their relative priority to the business
Business continuity policies and processes
Geographic risk

Risk Profile Construction 220

Impact of risk profile to the business
Capital expense/Operating expense
Recovery time/point objectives
Expected annual cost of downtime/data loss

Business Summary 230

Run failure scenarios
Hypothetical configuration, site and policy changes

*FIG. 2*

METHOD FOR DATA DISASTER RECOVERY ASSESSMENT AND PLANNING

CROSS REFERENCE TO RELATED CO-PENDING APPLICATIONS

This application claims the benefit of U.S. provisional application Ser. No. 61/057,638 filed on May 30, 2008 and entitled METHOD FOR DATA DISASTER RECOVERY ASSESSMENT AND PLANNING which is commonly assigned and the contents of which are expressly incorporated herein by reference.

FIELD OF THE INVENTION

The present invention relates to a computer implemented method for assessing the risk and cost for data loss, assessing the cost for data disaster recovery plans and selecting a data disaster recovery plan based on selected risk level and recovery cost.

BACKGROUND OF THE INVENTION

Most businesses and organizations depend and rely upon various types of data for performing their operations. Typical business data include manufacturing operations data, manufacturing equipment data, manufacturing process data, research and development data, business financial data, financial transactions data, booking and reservations data, sales and marketing data, customer records, member or client specific records, legal, administrative and personnel related data and security data, among others. These data are usually stored in storage devices including servers, magnetic storage devices, optical storage devices, or paper documents.

Data loss or interruption in the availability of the data for a period of time pose a significant risk in the operation of any business or organization. The process, policies and procedures of restoring operations critical to the resumption of business is called business continuity. A subset of business continuity is disaster recovery (DR). Disaster recovery includes regaining access to data (records, hardware, software, among others), communications (incoming, outgoing, phone, fax, Internet, e-mail, among others), workspace and other business processes after a disaster. DR planning includes data back-up and recovery solutions. DR planning is a needed process for any business or organization.

Furthermore, in many industries regulatory requirements exist for data back-up and recovery. In particular, in the banking and brokerage industries the SEC has introduced remote off-site data replication requirements and data recovery time limits. The US Department of Health and Human Services enacted the Health Insurance and Portability Act of 1996 (HIPPA) that mandates data availability requirements to ensure that information is available at all times. Associated with data loss are also security related threads and violations of personal financial or sensitive government or business data.

Understanding the need for disaster recovery is only the first step in the process. Equally important is determining the right data back-up and recovery strategy for a business. Many of the disaster recovery solutions are expensive, require specific technical expertise and dedicated technical personnel and equipment, are technologically complicated to implement, and in some cases time consuming and disruptive to the business information technology (IT) infrastructure and services.

Developing and selecting an appropriate and cost effective disaster recovery solution is a time consuming and complicated process. Accordingly, there is a need for a method that balances the risk and cost associated with data loss with the effectiveness and cost of the proposed disaster recovery solution.

SUMMARY OF THE INVENTION

In general, in one aspect, the invention features a computer implemented method for assessing and planning data disaster recovery (DR) including providing an application stored in memory and comprising instructions executable by a processor. Execution of the instructions by the processor causes the processor to perform operations including the following. Providing a graphical user interface (GUI) comprising first and second windows arranged adjacent to each other. The first window comprises a catalog of components used to generate data disaster recovery (DR) configurations and the second window displays the generated DR configurations. Next, generating a first DR configuration in the second window and then adding components to the first DR configuration by dragging and dropping components from the catalog into appropriate locations of the second window. Next, calculating metrics for the first DR configuration and reporting and displaying the first DR configuration metrics results in the second window.

Implementations of this aspect of the invention may include one or more of the following features. The computer implemented method may further include generating a second DR configuration in the second window and adding components to the second DR configuration by dragging and dropping components from the catalog into appropriate locations of the second window. Next, calculating metrics for the second DR configuration and reporting and displaying the second DR configuration metrics results in the second window. Finally, comparing the first and second DR configuration metrics results in the second window. The components include sites, arrays, workloads and processes. The metrics include capital expenses, annual operating expenses, time to recovery, expected annual cost of downtime, expected annual cost of data loss, data reliability and uptime. The metrics results are presented as graphics or text. Each of the sites comprises configurable parameters for name, address, description, purchase cost, operating cost, average unscheduled downtime per year, disaster frequency, mean time between major disasters, and network reliability. Each of the arrays comprises configurable parameters for name, purchase cost, operating cost, volumes, capacity, storage type, ratings and processes. Each of the workloads comprises configurable parameters including name, restart time, recovery time, update rate, data value, volumes, cost of downtime and processes. Each of the processes comprises configurable parameters for name, data backup type, data backup frequency, operating cost, purchase cost, buffer size, mirror type, space efficiency and data backup policies. The method may further include adding a new a component to the catalog by transferring a component configured in any of the DR configurations from the second window to the first window.

In general, in another aspect, the invention features a system for assessing and planning data disaster recovery (DR) for an entity including a processor, memory coupled to the processor and an application stored in the memory and comprising instructions executed by the processor. The application includes a graphical user interface comprising first and second windows arranged adjacent to each other.

The first window comprises a catalog of components used to generate data disaster recovery (DR) configurations and the second window displays the generated DR configurations. The application also includes means for generating a first DR configuration in the second window, means for adding components to the first DR configuration by dragging and dropping components from the catalog into appropriate locations of the second window, means for calculating metrics for the first DR configuration and means for reporting and displaying the first DR configuration metrics results in the second window.

In general, in another aspect, the invention features a computer-readable medium having instructions stored thereon, which when executed by a processor cause the processor to perform operations including providing a graphical user interface (GUI) comprising first and second windows arranged adjacent to each other. The first window comprises a catalog of components used to generate data disaster recovery (DR) configurations and the second window displays the generated DR configurations. The operations further include generating a first DR configuration in the second window, adding components to the first DR configuration by dragging and dropping components from the catalog into appropriate locations of the second window, calculating metrics for the first DR configuration and reporting and displaying the first DR configuration metrics results in the second window.

BRIEF DESCRIPTION OF THE DRAWINGS

FIG. 2 is a flow diagram of a method for disaster recovery assessment and planning according to the present invention;

DETAILED DESCRIPTION OF THE INVENTION

Figure 1:
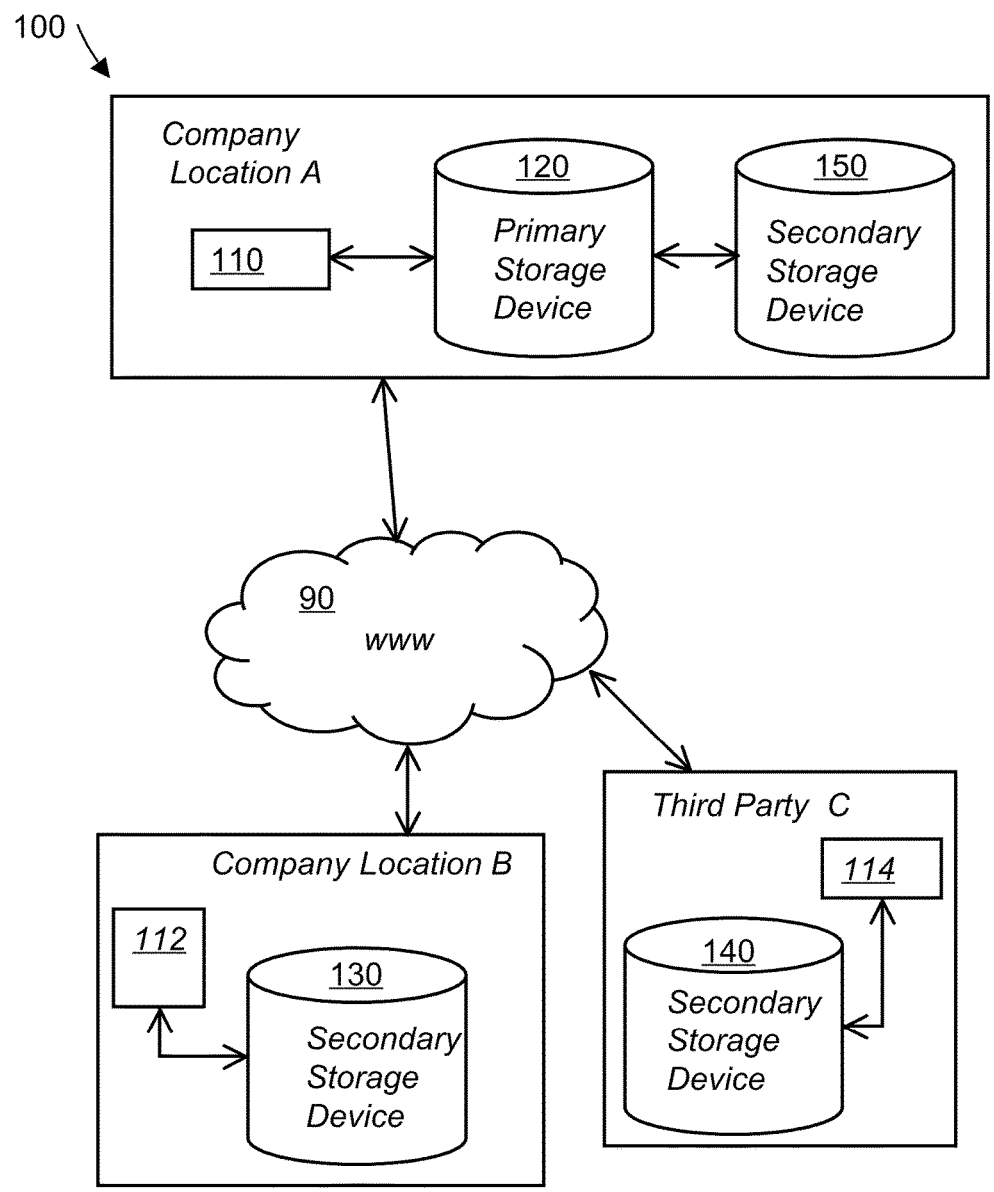
FIG. 1 is an overview diagram of a disaster recovery system.

Disaster recovery (DR) solutions include local and remote data replication, data tape backup/archiving and restoration and Redundant Array of Inexpensive Disks (RAID) solutions. Data replication/mirroring involves copying company data normally stored in a primary storage device onto secondary ("mirror") storage devices. Referring to FIG. 1, disaster recovery system 100 provides local and remote data replication and includes a primary storage device 120 and secondary ("mirror") storage devices 130, 140, 150. The secondary storage devices is located locally 150 within the company location A or is a remote storage device 130, 140 located at a remote company location B or at a third party's location C, respectively. Secondary remote storage devices 130, 140 are connected to the primary storage device 120 via a network 90. Each storage device 120, 130, 140, 150 is also connected to one or more computing devices 110, 112, 114. If the primary storage device 120 should fail, data on any of the secondary storage devices 130, 140, 150 is immediately promoted to primary status and brought online. Data replication/mirroring is a continuous process that begins by establishing a complete copy of data at risk at the disaster recovery site, i.e., the location of the secondary storage device. With that copy as a baseline, the replication process continues, recording any changes to data and forwarding those changes to update the secondary storage site. An important parameter in the recovery process is the time-to-recovery (TTR), defined as the time it takes to recover the data. Quick TTR is an important requirement in the disaster recovery solutions.

In the data replication/mirroring the "mirror" storage device is updated in parallel with the primary storage device, providing a real-time or near real-time copy of the primary storage device. Local mirroring provides the first level of data protection with a mirror storage device 150 attached to the host machine 120 located at the primary company site A.

In the event of data loss on the primary storage device 120, the data are retrieved seamlessly from the mirror storage device 150. There are two types of mirroring techniques that may be used over a network connection 90 to establish a copy of the primary site data, synchronous or asynchronous. In the synchronous mirroring, each write transaction to the primary storage device 120 is sent to the remote mirror storage device 130 and the application cannot continue until that transmission is acknowledged from the remote location. The synchronous mirroring process depends on the network 90 connection bandwidth (speed) and the distance between the primary 110 and secondary sites 112, 114. Synchronous mirroring solutions provide maximum data protection at the expense of degraded primary site performance and reduced network throughput on the link to the DR center 110. In the asynchronous mirroring multiple writes are transmitted without waiting for individual acknowledgments. Asynchronous mirroring has minimal impact on performance and offers the additional benefit of "near real-time" availability of data. The online standby of data is only a few writes behind the primary site. A special asynchronous mirroring process is the asynchronous batched mirroring whereby data are transmitted in batches at predetermined time intervals. In one example, network connection 90 is the Internet. In other examples, the network connection 90 may be a phone network, a cable network, or other wireless or a wired networks. The primary and secondary storage devices and computing platforms are not required to have the same characteristics.

Data tape backup/archiving and restoration refers to copying data on physical tapes or other physical storage media and storing of the physical tapes/storage media in both local and remote vaults. Many companies follow the practice of sending their physical tapes to a remote storage facility (possibly operated by a third party) after a certain time period has elapsed. It is convenient for companies to have very recent tapes available locally, so as to quickly recover specific files in the case of user error. However, keeping all of their tapes locally represents a major risk.

RAID refers to combining multiple small, inexpensive disk drives into an array of disk drives and spreading data across this array of disk drives, using techniques such as disk striping (RAID Level 0) and disk mirroring (RAID level 1) to achieve redundancy, lower latency and/or higher bandwidth for reading and/or writing, and recoverability from hard-disk crashes.

Other DR solutions include online data replication and near-line archiving, whereby disks are used as backups or archives for disk-to-disk backup, virtual tape library (VTL) and data deduplication, among others. Online data replication and recovery solutions continue to gain significant market adoption. They provide a cost effective and efficient data protection for a given recovery time, i.e., minimally acceptable time to recover from a loss and a given recovery point i.e., minimally acceptable data loss, objectives while solving the problem of backup and recovery, offsite data protection and the significant IT management that goes with each of those tasks.

In summary, there are too many options for DR available and the process of selecting an efficient and cost effective DR solution is confusing and time consuming. Accordingly, there is a need for a method for selecting an efficient and cost effective DR solution that fits the specific requirements of each business.

The present invention describes a computer implemented method and an application for assessing DR risks and selecting an efficient and cost effective DR solution. Referring to FIG. 2, the method 200 of selecting an efficient and cost effective DR solution for a specific business or organization includes the following steps. First, an assessment of the company's data infrastructure, data availability and application availability takes place (210). Next, a company risk profile is constructed (220) and then a business summary is presented (230).

The step of assessing the company's data infrastructure includes performing a "bottom-up" assessment of the existing information technology (IT) infrastructure by cataloging existing replicating sites, components, enclosures, applications and systems. Replicating sites are the locations/computing devices that are involved in the data replication process. In the replication cluster 100 of FIG. 1, the replication sites are company location A associated with computing device 110, company location B associated with computing device 112, and third party location C associated with computing device 114. The data storage components of site 110 are primary storage device 120 and secondary storage device 150. The data storage component of site 112 is the secondary storage device 130 and the data storage component of site 114 is the secondary storage device 140.

The assessment step 210 also includes assessing data availability, application availability, application workloads/tiers and their relative priority to the business. A workload is a single set of components which share the same availability, performance and service level requirements. For the purposes of this invention, a workload includes a set of volumes stored on one or more arrays located at a single site. The reliability of a workload is a function of the probability of failure of the disks that compose the volumes, the arrays that house the disks, and the site which houses the array. A workload may have one or more processes attached to it, e.g. remote mirrors or backup schedules. When a workload is extended via a process like remote mirroring, the availability of the data is increased. The assessment step 210 also includes assessing the company's business continuity policies and processes and the geographic risk.

The risk profile construction step 220 includes evaluation of the impact of the selected risk profile to the business, evaluation of the capital and operating expenses for the selected DR configuration, evaluation of the recovery time and point objectives and evaluation of the expected annual cost of a possible downtime and data loss.

Figure 3:
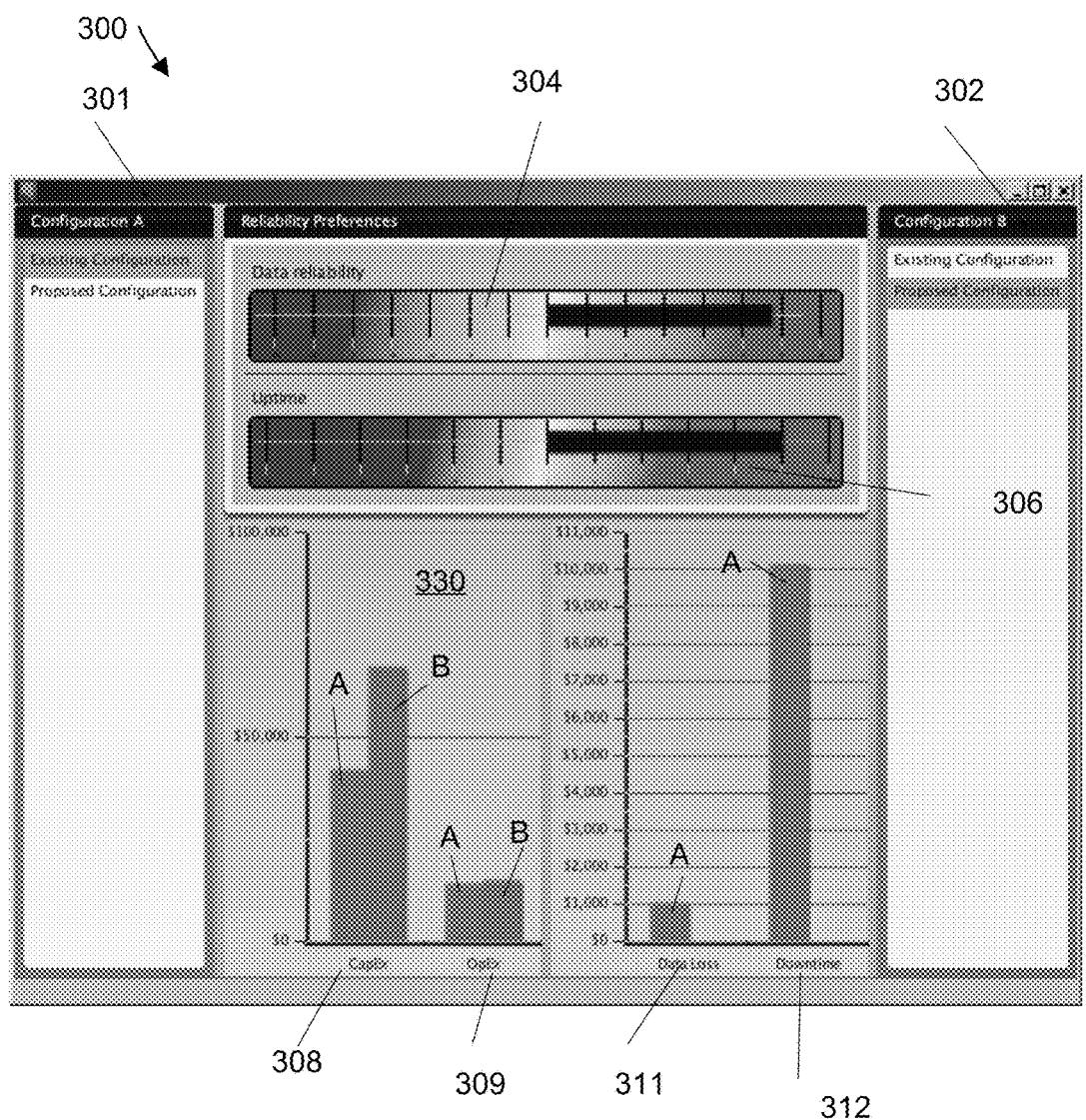
FIG. 3 is a screenshot of the DR assessment and planning application depicting a comparison of an existing DR configuration with a proposed DR configuration.
Figure 4:
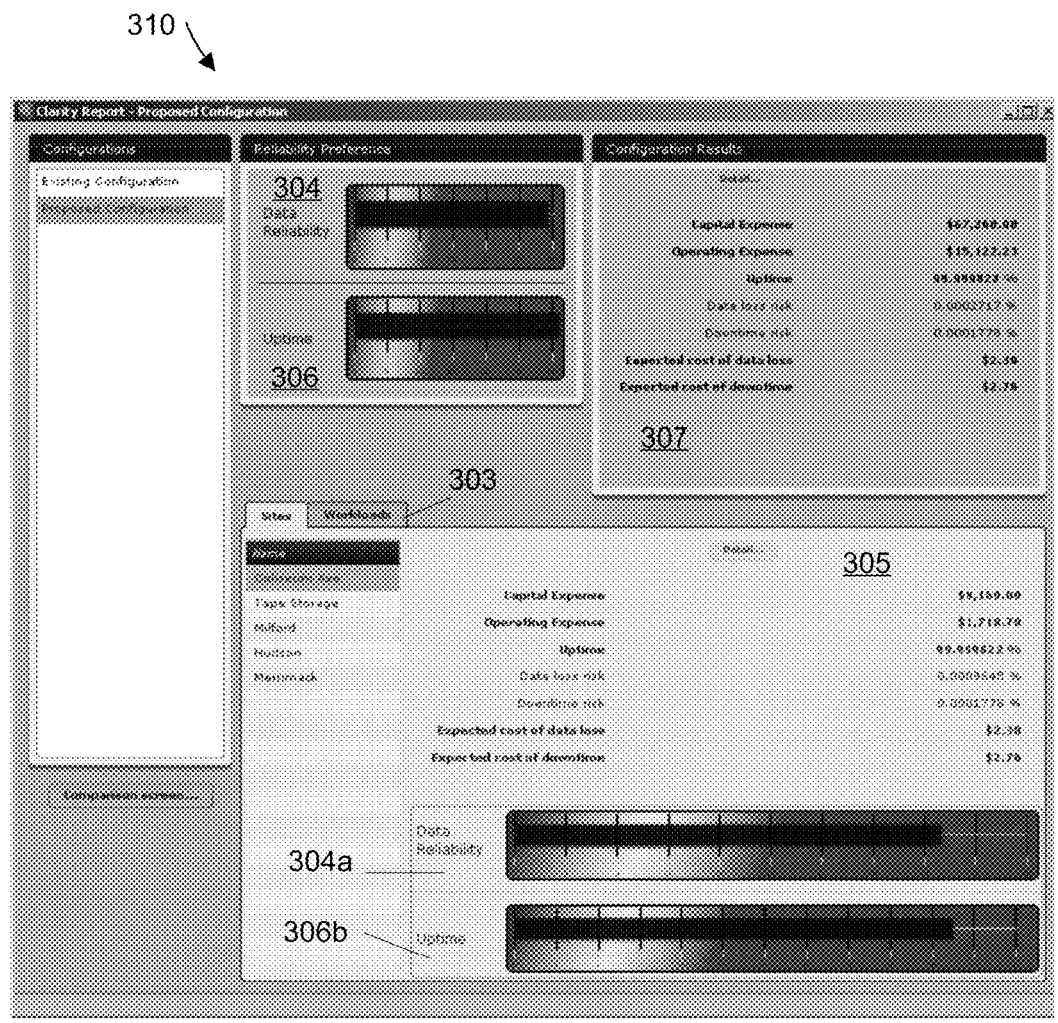
FIG. 4 is a screenshot of the DR assessment and planning application depicting a detailed view of the proposed configuration of FIG. 3.

The business summary step 230 includes running several failure scenarios and describing hypothetical configuration, site and policy changes. The results of the various scenarios are compared and graphically presented, as shown in FIG. 3, where configuration A 301 is graphically compared to configuration B 302. The graphical comparison includes capital costs 308, operating costs 309, annual cost of data loss 311 and annual cost of downtime 312. Data reliability 304 and uptime 306 meters indicate which configuration achieves better results. A detailed report for each configuration is also graphically presented, as shown in FIG. 4. The detailed configuration report 310 of a proposed configuration includes a graphical presentation of the data reliability 304 and uptime 306 meters, a detailed description of each included site 305 and workload 303 including the per site and per workload costs and performance parameters and a summary 307 of the cumulative numerical values for the various configuration parameters including capital and operating costs, data loss and downtime costs, data loss risk and downtime risk and uptime probability.

Figure 5:
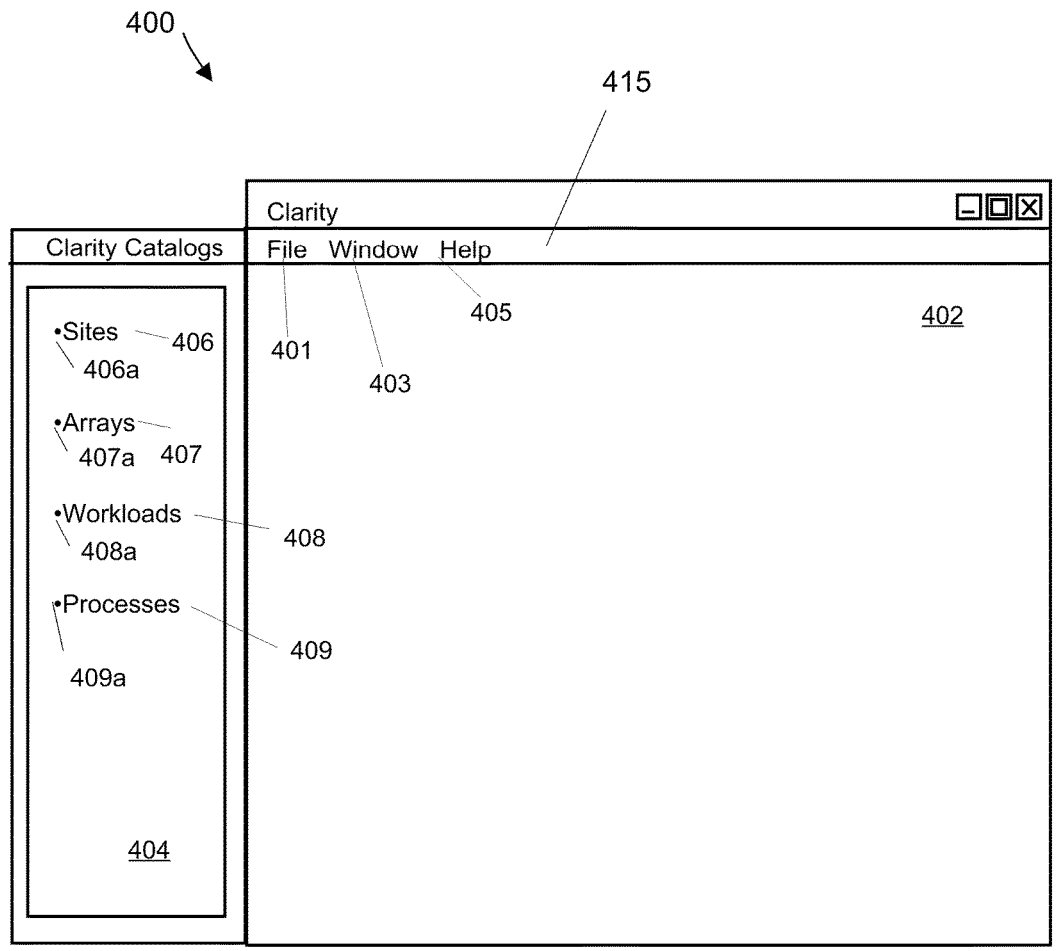
FIG. 5 is a screen diagram of the starting window of the DR assessment and planning application.
Figure 6:
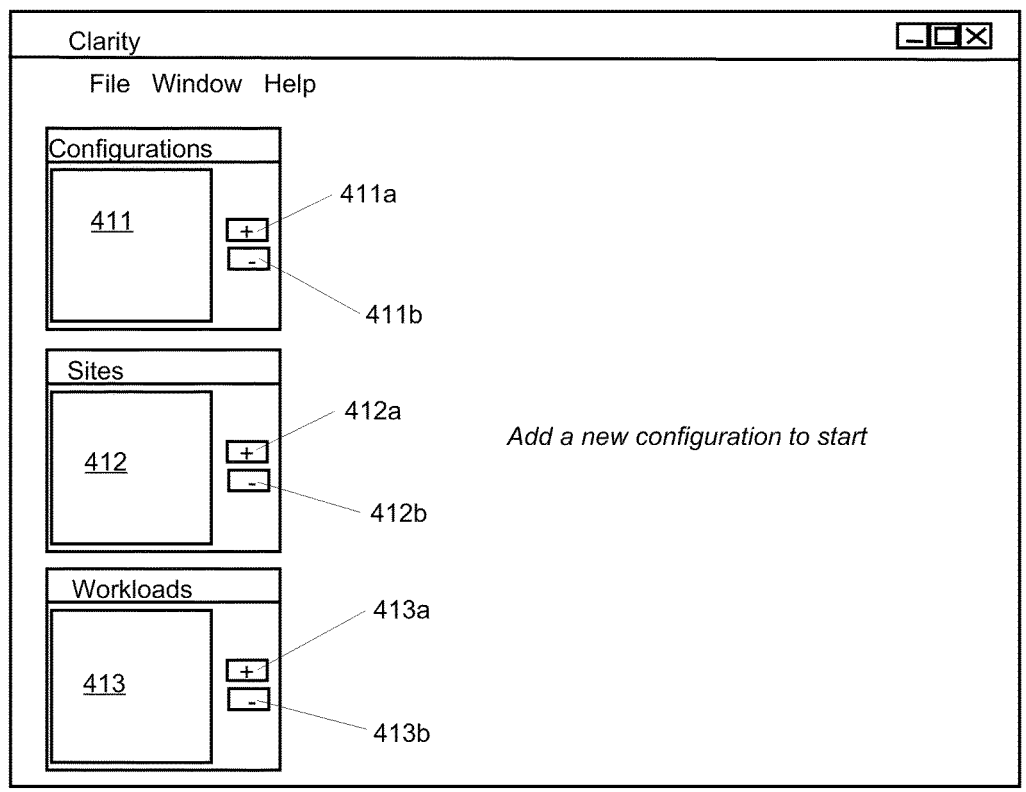
FIG. 6 is a screen diagram of the DR assessment and planning application depicting adding a new configuration.

The computer implemented application program for assessing DR risks and selecting an efficient and cost effective DR solution is described with reference to FIG. 5 to FIG. 22. The computer application of this invention (i.e., Clarity AP) is installed in a computer and is started by clicking on the corresponding application icon. Referring to FIG. 5, starting the computer application results in displaying the graphical user interface (GUI) 400, which includes the main application window 402 and the catalogs window 404. The main application window 404 includes a header 415 with the fields of file 401, window 403 and help 405. The catalogs window 404 includes the component fields of sites 406, arrays 407, workloads 408 and processes 409. One or more configurations are quickly and easily created by dragging and dropping components (i.e., sites 406, arrays 407, workloads 408 and processes 409) from the catalogs window 404 into the appropriate location of the main window. The component parameters are then set as needed.

Figure 7:
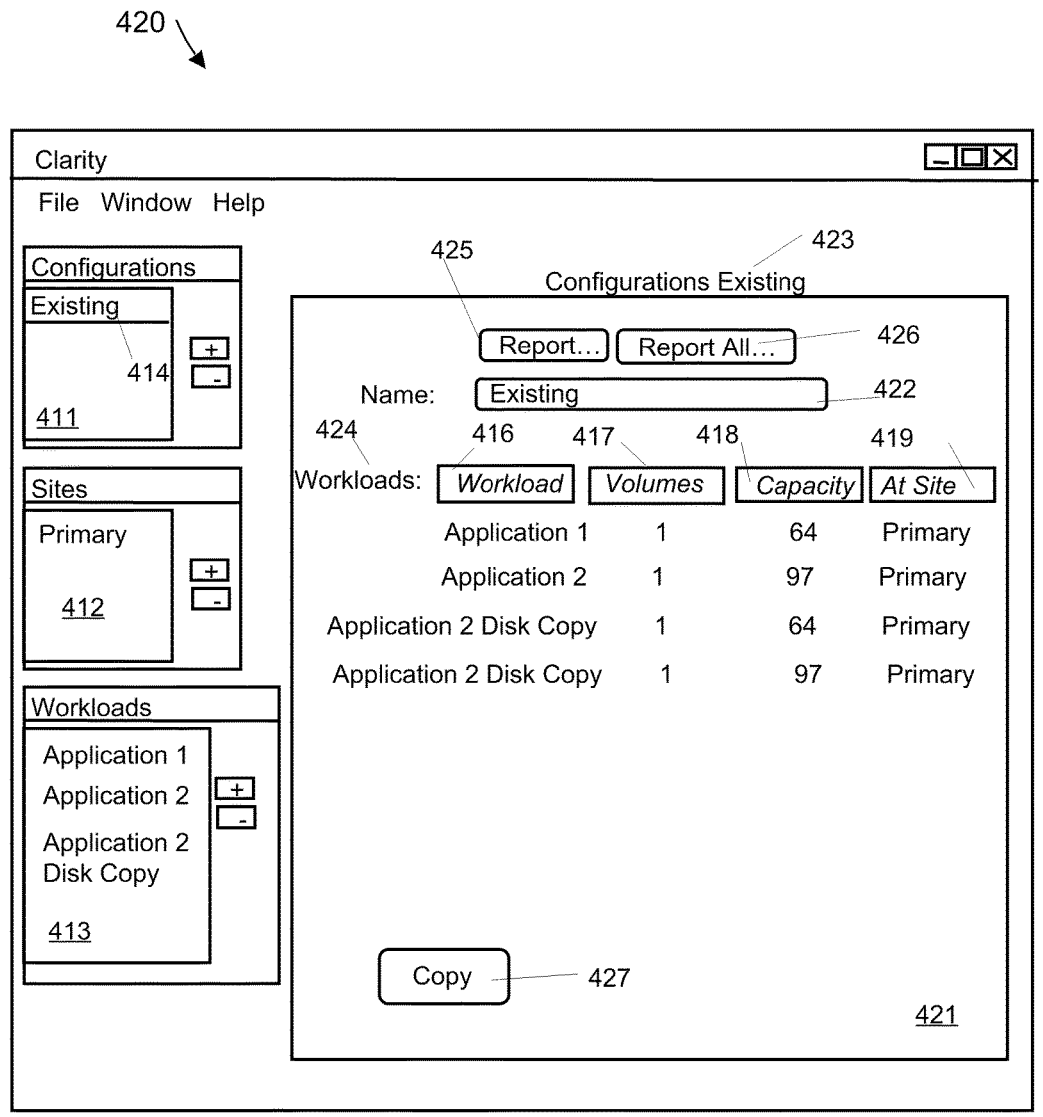
FIG. 7 is a screen diagram of the DR assessment and planning application depicting the new (existing) configuration.
Figure 8:
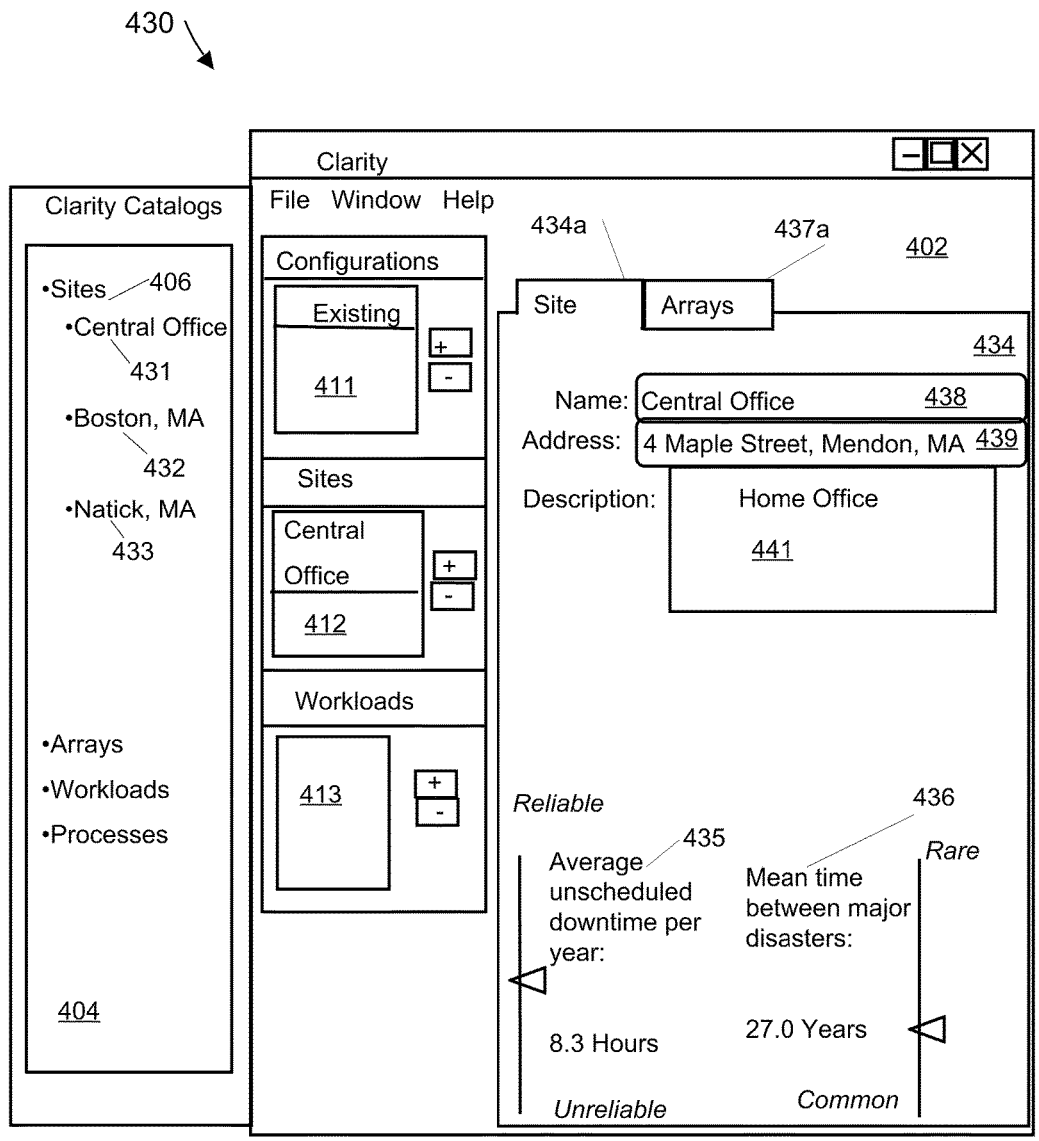
FIG. 8 is a screen diagram of the DR assessment and planning application depicting the central office site of the existing configuration of FIG. 7.
Figure 9:
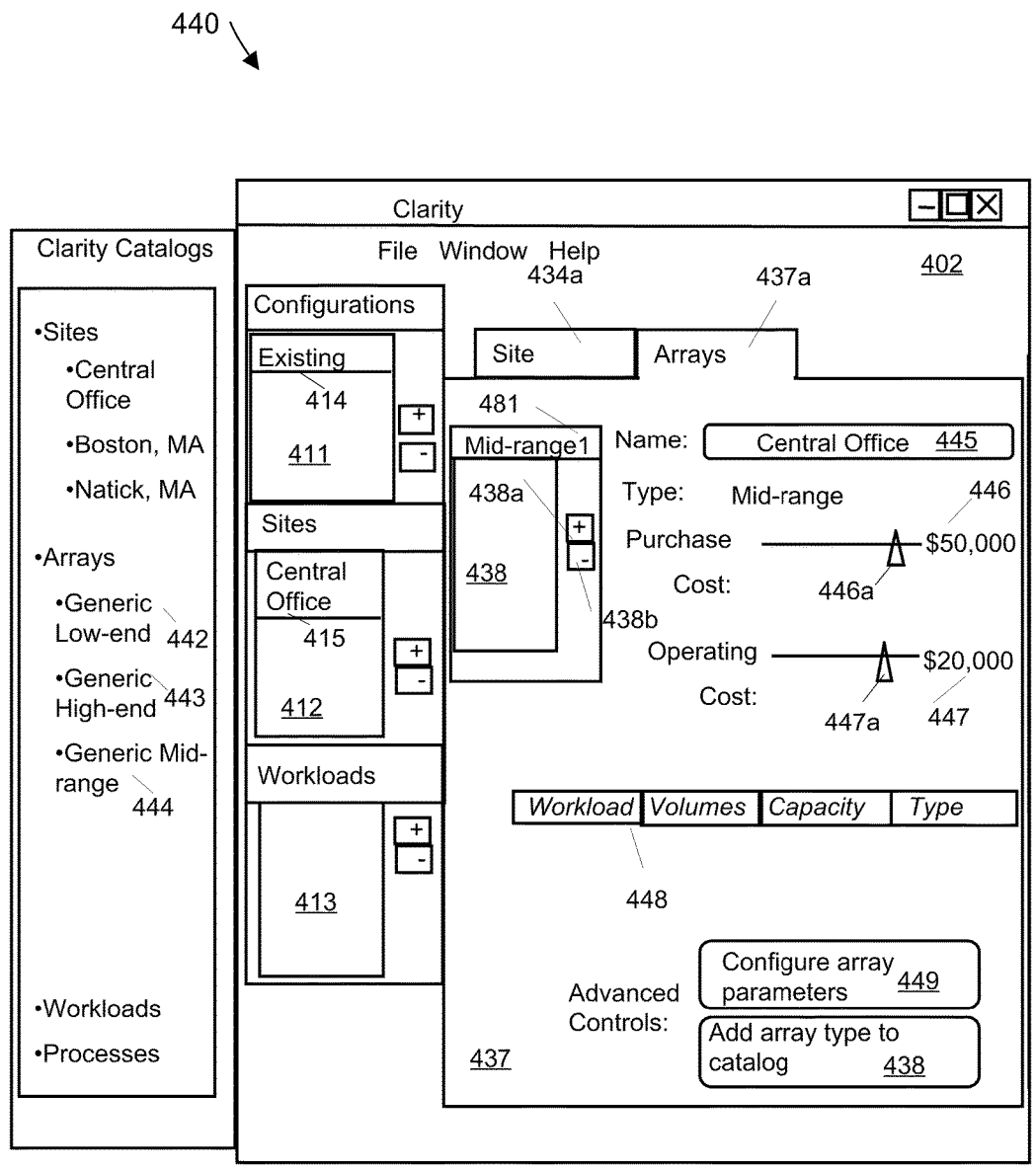
FIG. 9 is a screen diagram of the DR assessment and planning application depicting the arrays of the central office site of FIG. 8.
Figure 10:
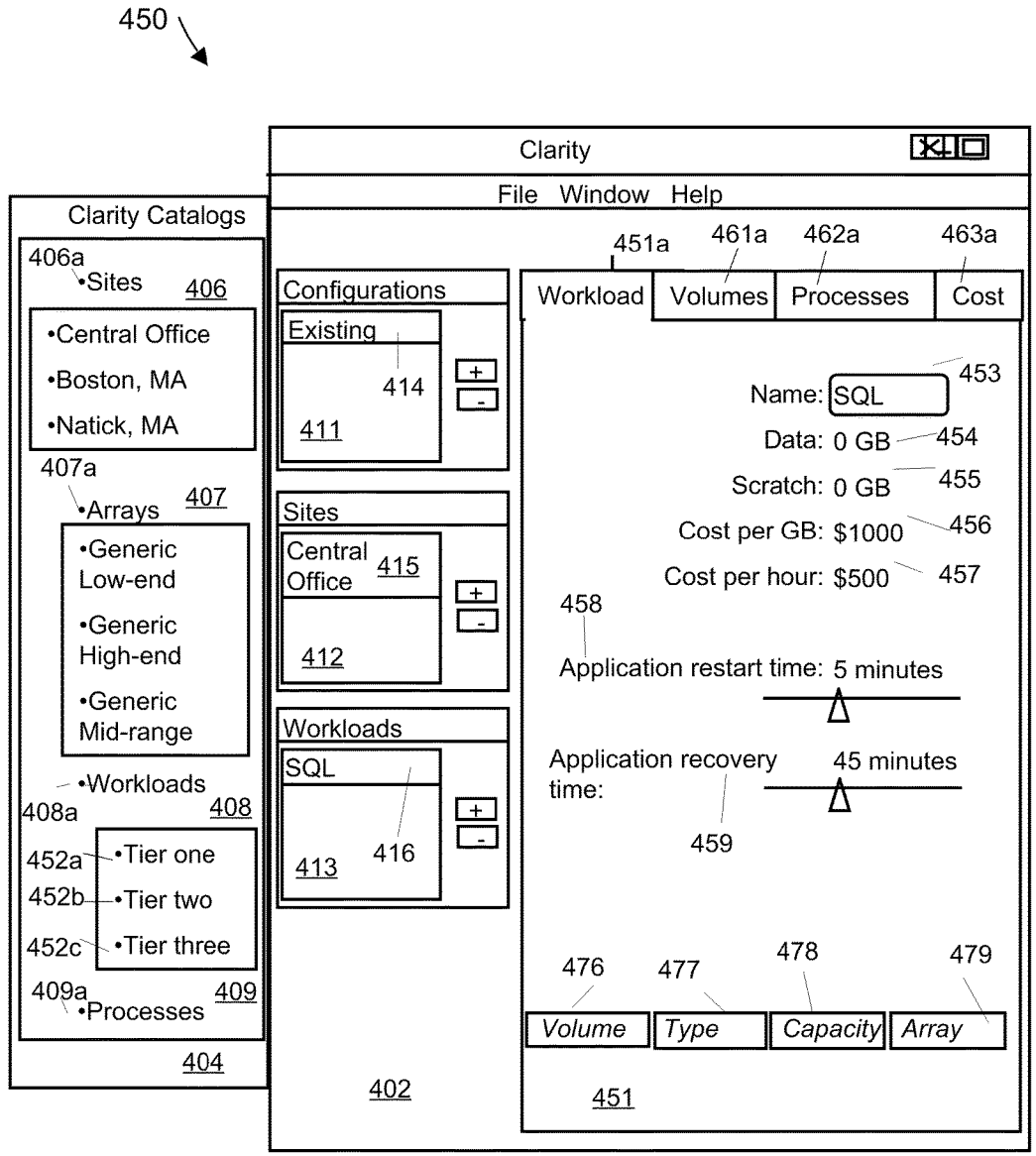
FIG. 10 is a screen diagram of the DR assessment and planning application depicting the workloads of the configuration of FIG. 7.
Figure 11:
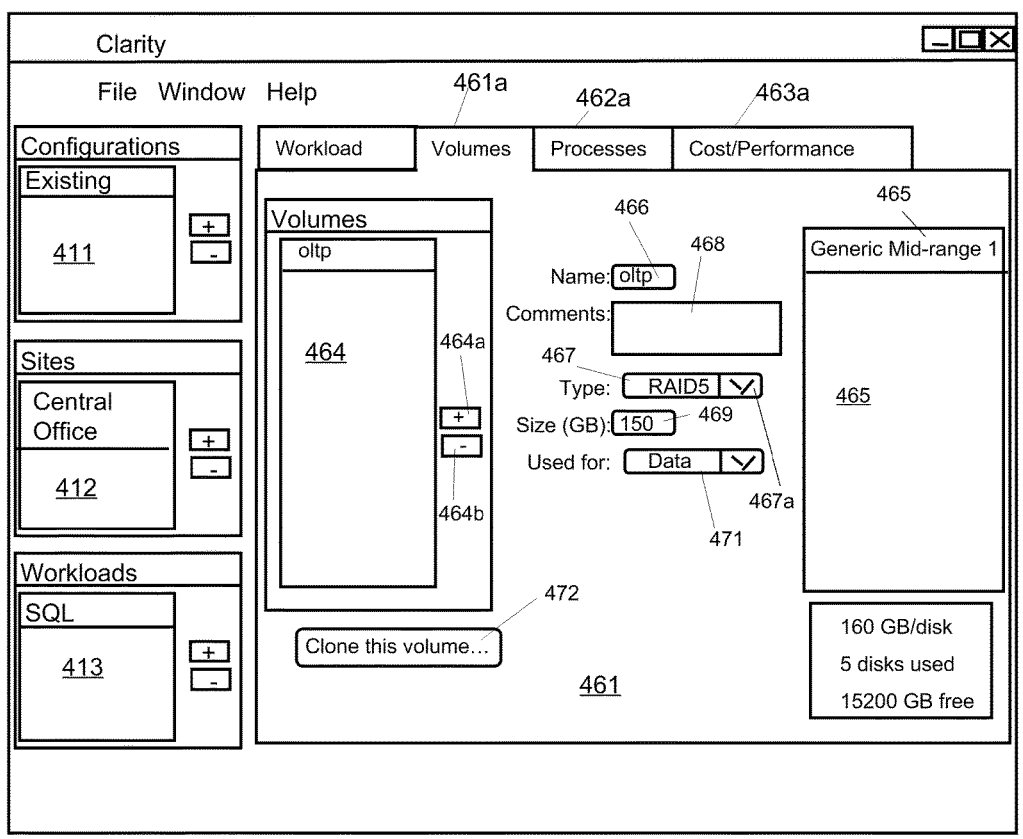
FIG. 11 is a screen diagram of the DR assessment and planning application depicting adding a volume to the workload of FIG. 10.
Figure 12:
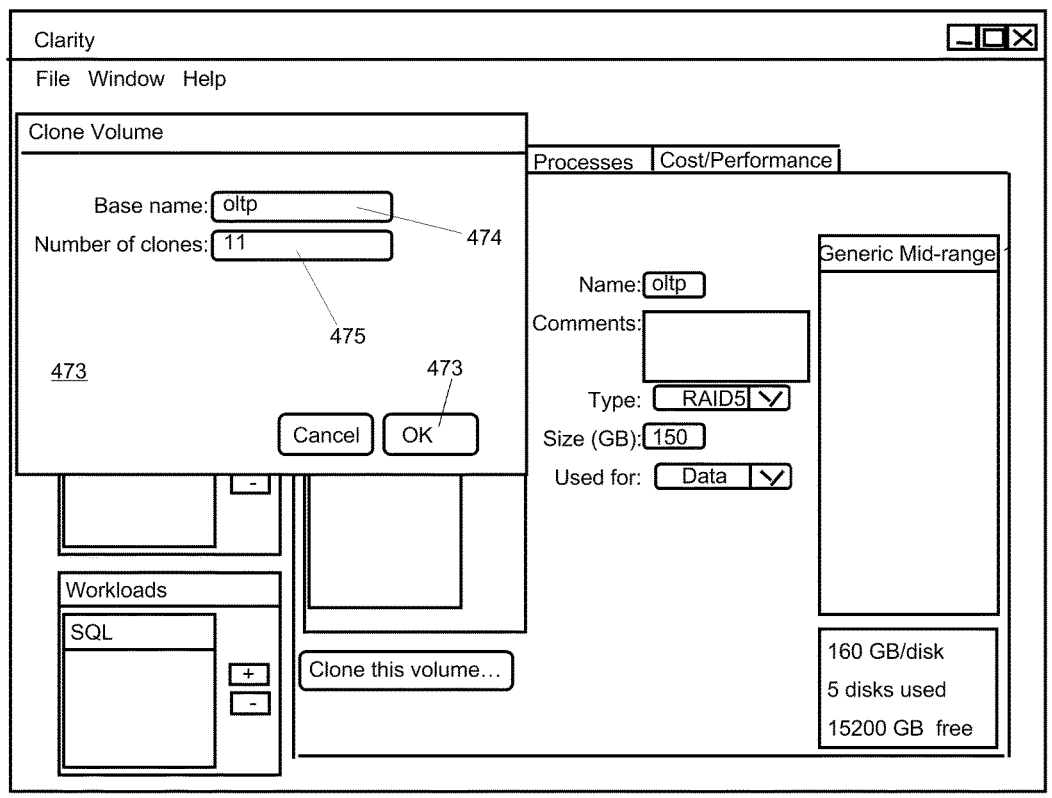
FIG. 12 is a screen diagram of the DR assessment and planning application depicting cloning the volume of FIG. 1 and adding eleven cloned volumes to the workload of FIG. 10.
Figure 13:
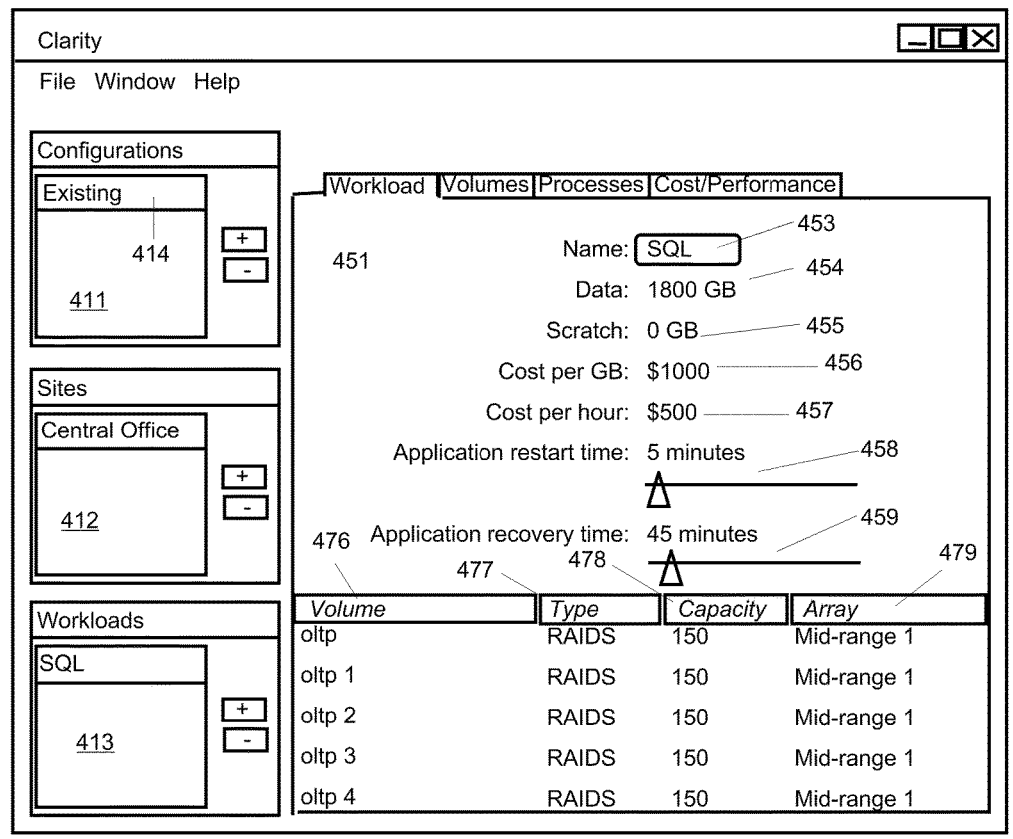
FIG. 13 is a screen diagram of the DR assessment and planning application depicting the workload of FIG. 10 with the added volumes of FIG. 12.

The operation of the application is illustrated using an example where two configurations ("existing" and "existing+backup") are created, then reports are generated for each configuration and then the various results metrics of the two configurations are compared. First, we click the window field 403 and locate the configuration box 411, shown in FIG. 6. Also, shown are the sites box 412 and the workloads box 413. Each box 411, 412, 413 includes (+) and (−) buttons, 411a, 411b, 412a, 412b, 413a, 413b, respectively. Next, we click on the configuration (+) button 411a, whereupon the configuration window 421 appears, as shown in FIG. 7. Configuration window 421 includes a name field 422, workloads field 424 and buttons for report 425, report all 426 and copy 427. The workloads field 424 includes workload 416, volumes 417, capacity 418 and the site 419 where they are located. In one example, the workload is "Application 1", in volume 1 which has a capacity of 64 GB and is located in the primary site. We click in the name field 422 to highlight the name and write "existing" as the name of the created configuration. The "existing" configuration describes a customer's existing data storage configuration that is to be assessed in this example. The new name now appears at the top 423 of the configuration window 421. In the catalogs window 404, we click on the round button 406a to the left of the sites category 406 in order to expand the sites category 406, shown in FIG. 5. In the example of FIG. 8, the expanded sites category 406 includes a "Central office" 431, a "Boston office" 432 and a "Natick office" 433. We click and drag the "Central office" site 431 from the catalogs window 404 to the sites box 412 in the main window 402. In this way we have created our first site 434. The "Central office" site 434 includes a name field 438, an address field 439, a site description field 441 and adjustable parameters for "Average unscheduled downtime per year" 435 and "Mean time between disasters" 436. In this example, we use the default values of 8.3 hours and 27 years for these parameters, respectively. Next, we click on the arrays tab 437a next to the site tab 434a near the top of the site window 434, whereupon an empty array box 438 will appear. In the catalogs window 404, we click on the round button 407a to the left of the arrays category 407 in order to expand the arrays category 407. The expanded arrays category 407 includes a "Generic Low-end" 442, a "Generic High-end" 443 and a "Generic Mid-range" 444 arrays, as shown in FIG. 9. We click and drag the "Generic Mid-range" 444 array from the catalogs window 404 to the arrays box 438. In this way we have added a "Generic Mid-range" array 444 to the configuration in the "Central Office" site 412. The arrays window 437 includes a number of parameters that can be adjusted for a given array via text entry, via sliders 446a, 447a or by clicking the configure array parameters button 449. These parameters include array name 445, purchase cost 446, operating cost 447, array and disk details 448. There are also buttons for configuring the array parameters 449 and for adding array types to the catalog 438. In this example, we will keep the default array purchase cost of $50,000 and operating cost of $20,000 annually. The sliders 446a, 447a can be operated by either clicking on the slider and dragging the slider or by clicking on the slider and moving the slider with the keyboard arrow keys. Next, we create a workload 413 and add it to the site we created, as shown in FIG. 10. As was mentioned above, a workload may be either an application or a set of applications with a common set of service level requirements In the catalogs window 404, we click on the round button 408a to the left of the workloads category 408 in order to expand the workloads category. The expanded workloads category includes "Tier one" 452a, "Tier two" 452b, and "Tier three" 452c. Next, we click and drag the "Tier-one" workload 452a from the catalogs window 404 to the workloads box 413, thereby adding a workload to the workload window 451. Next we change the name of the workload to better reflect the application it describes. In this example, we change it to "SQL". Other adjustable application variables, shown in workload window 451 include, data value 454, scratch 455, cost per gigabyte (GB) 456, cost per hour 457, application restart time 458, application recovery time 459, volume 476, type of volume 477, capacity 478 and array 479 where the application is located. There are a number of tabs next to the workload tab 451a which include volumes tab 461a, processes tab 462a, cost/performance tab 463a. Tabs 461a, 462a, 463a open corresponding windows for volumes 461 (shown in FIG. 11), processes 462 (shown in FIG. 16), and cost/performance 463 (shown in FIG. 18) associated with workload 451. Volumes 461 describe the storage used by the workload 451. Processes 462 describe the processes associated with workload 451 and allow adding processes and policies for data protection and DR purposes to a workload. Cost/performance 463 allows setting key cost metrics to the workload including cost per hour of downtime and cost per Gigabyte (GB) of data. These data are typically determined through customer interview/discussion and are set as the default in this example Next, we click on the volumes tab 461a and on the (+) button 464a in the volumes box 464 to create volumes associated with the workload, as shown in FIG. 11. In the name field 466 we use the name "oltp" to describe the volume. Next, we click on Mid-range 1 465a in the arrays box 465, and use the pull-down menu 467a to set the volume type to RAID5 467 and then enter 150 GB in the size (GB) field 469. Next, we click on the clone this volume button 472, enter 11 as the number of requested clones 475 and then click the OK button 473, as shown in FIG. 12. In this way we have created a total of 12 150 GB volumes associated with the SQL workload. Next, we go back to the workload tab 451a, to view the workload 451 with its associated storage, which now has a capacity 454 of 1800 GB or 1.8 TB of data, shown in FIG. 13.

Figure 14:
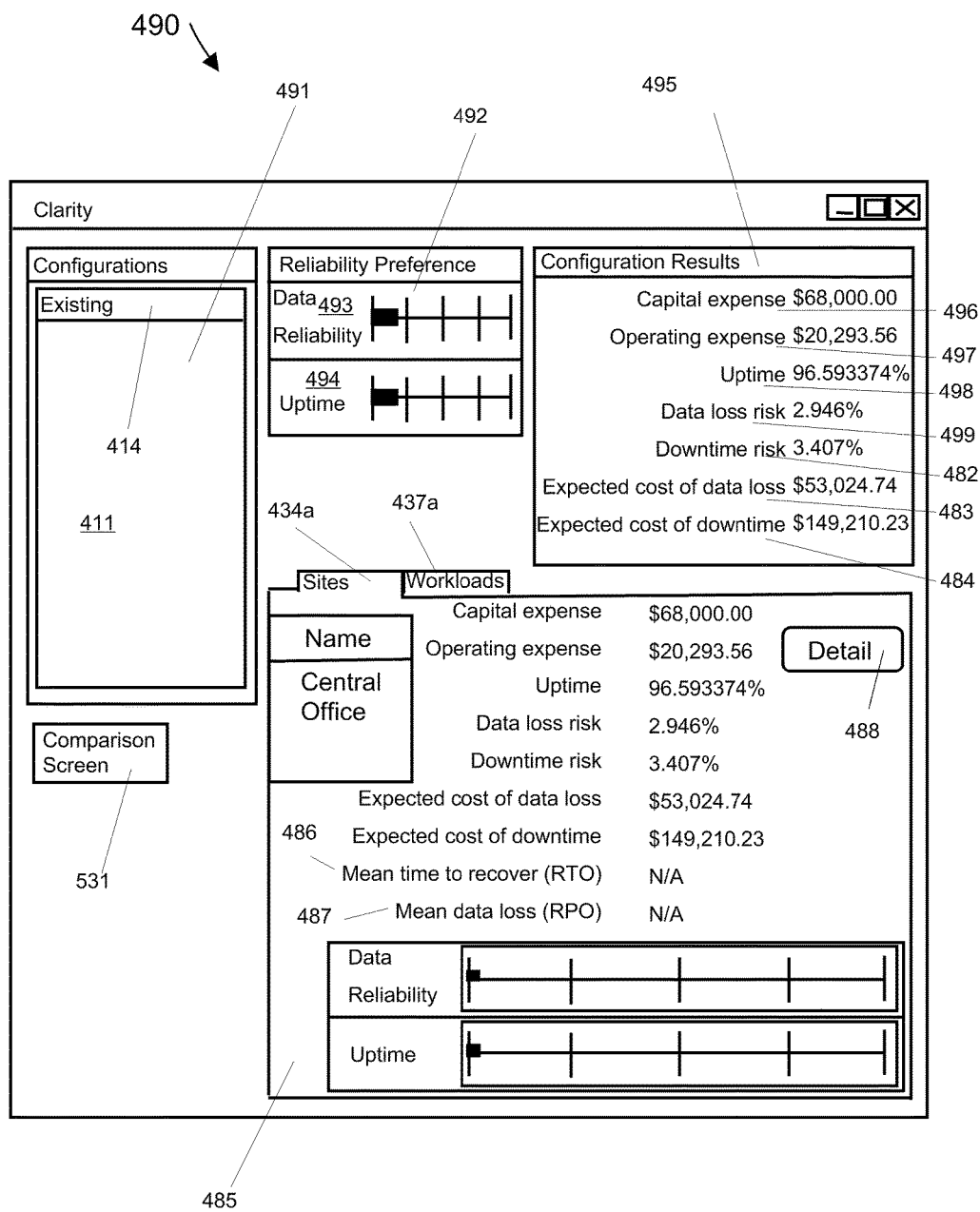
FIG. 14 is a screen diagram of the DR assessment and planning application depicting the existing configuration and its components.
Figure 15:
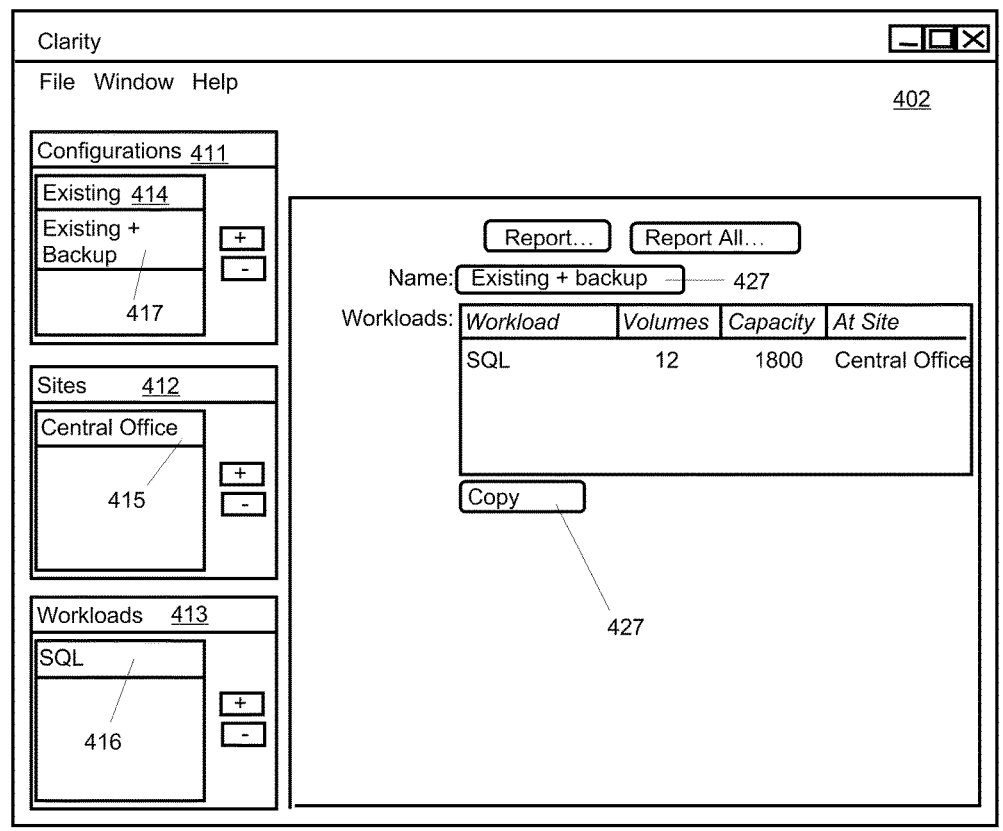
FIG. 15 is a screen diagram of the DR assessment and planning application depicting copying the existing configuration and creating an existing+backup configuration.
Figure 16:
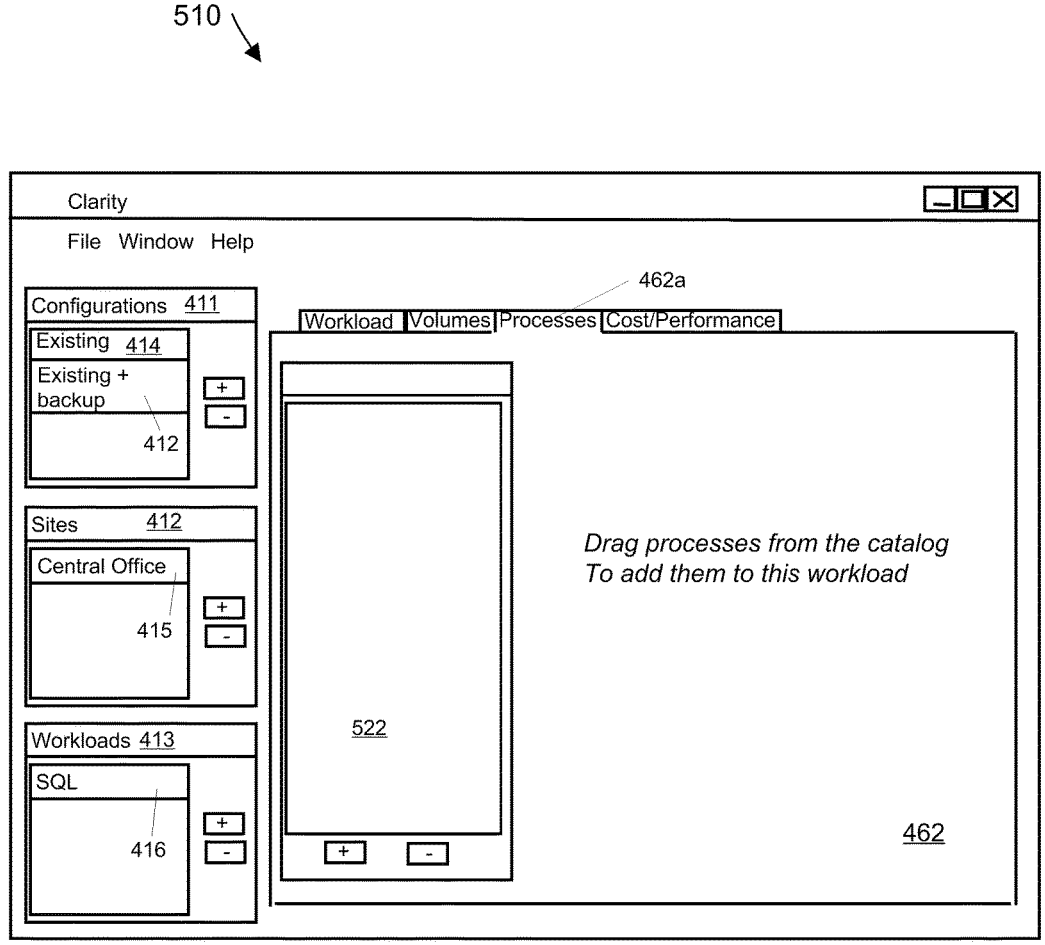
FIG. 16 is a screen diagram of the DR assessment and planning application depicting adding processes to the existing+backup configuration.
Figure 17:
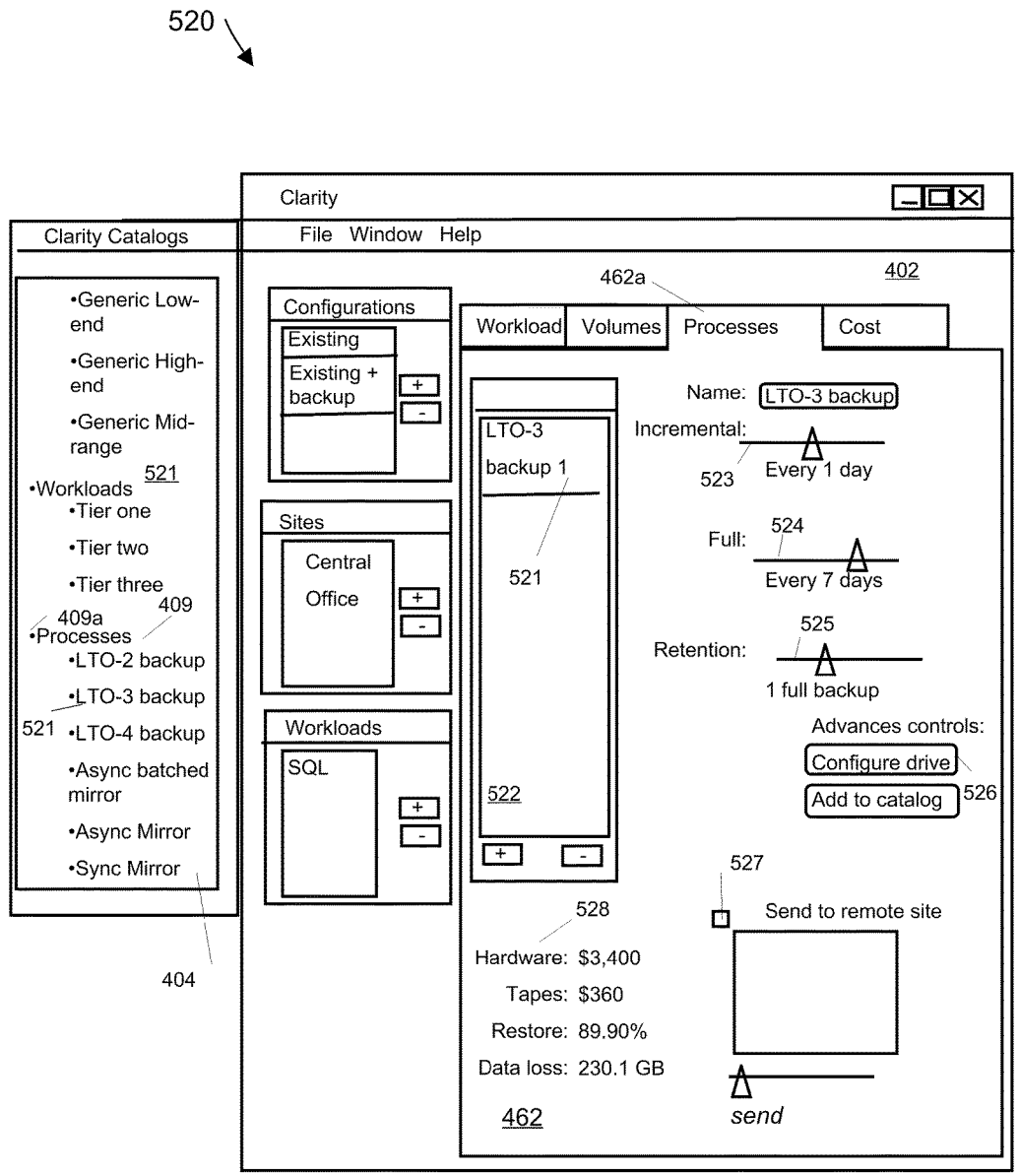
FIG. 17 is a screen diagram of the DR assessment and planning application depicting the details of the added processes to the existing+backup configuration.
Figure 18:
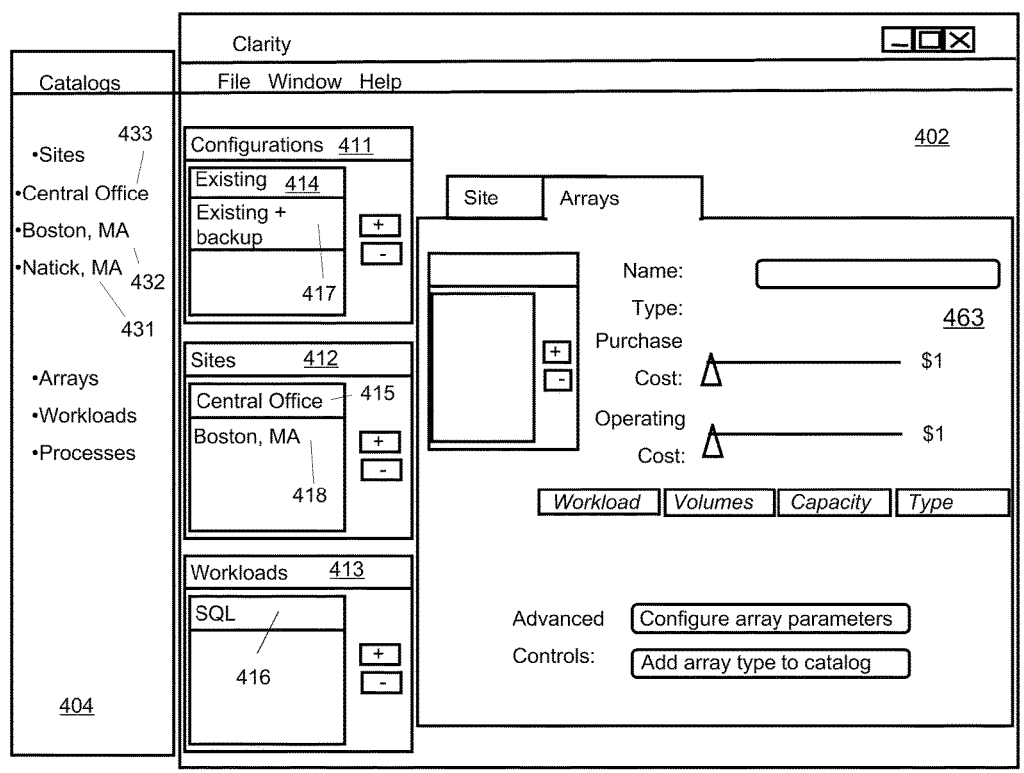
FIG. 18 is a screen diagram of the DR assessment and planning application depicting adding a new site and arrays to the existing+backup configuration.

In order to view the results of this first configuration, we click on the "Existing" field 414 inside the configuration box 411 and then we click on the Report button 425, shown in FIG. 7. A screen will pop up momentarily showing the results of this configuration, as shown in FIG. 14. The top left of the screen 491 shows the configurations, the top middle 492 shows meters which illustrate the overall data availability in terms of data reliability 493 and uptime 494, the right middle 495 shows the aggregate results for the configuration and includes key metrics such as capital expense 496, operating expense 497, uptime 498, data loss risk 499, downtime risk 482, expected annual cost of data loss 483, and expected annual cost of downtime 484. The bottom of the screen 485 shows the same parameters on a per site or per workload basis and also adds the mean time to recover (RTO) 486 and mean data loss (RPO) 487. In this example, the values are N/A because there is no process for recovering data in this configuration. The "Detail" button 488 on top of the results screen 485 can be clicked to show further details that include amount of downtime in minutes and amount of data loss in MB or GB. This configuration is saved by clicking on the File→Save menu 401 on the main window 402. We enter a name for this configuration, choose a directory and the configuration is saved in a file with .cyr extension. The saved configuration can be reloaded in the future using the File→Open menu 401 or by simply double-clicking on the file.

Figure 19:
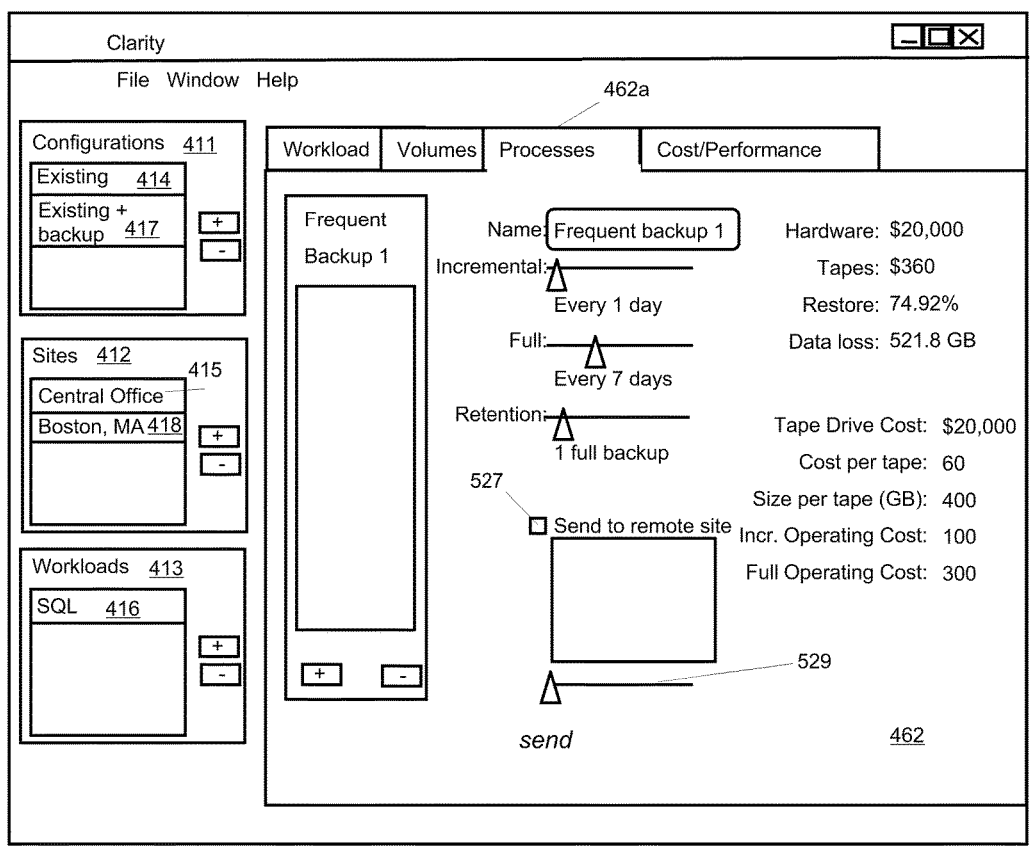
FIG. 19 is a screen diagram of the DR assessment and planning application depicting adding a new policy to the existing+backup configuration.

The full value of the application lies in its ability to create multiple configurations and compare their cost and benefits. In the next steps, we will create a second configuration that incorporates changes of the first configuration. In one example, the new configuration adds a backup process to the original configuration. We go back to the main window 402 and click on "Existing" 414 in the configurations box 411. Next, we click on the copy button 427 and add the name "Existing+backup" in the name box 422, as the name of the new configuration, shown in FIG. 15. Next, we click on SQL 416 in the Workloads box 413 and click on the Processes tab 462a, shown in FIG. 16. In the catalogs window 404, we click on the round button 409a to the left of the Processes category 409 in order to expand the processes category, shown in FIG. 17. The expanded processes category includes LTO-2 backup, LTO-3 backup and LTO-4 backup. We then click and drag the "LTO-3 backup" process 521 from the catalogs window 404 to the processes box 522 in the main window 402, thereby adding a backup process to the new configuration. There are several parameters that can be adjusted via sliders, checkboxes or the configure drive button 526 for tape backups. These parameters include incremental backup frequency 523, full backup frequency 524, retention policy 525, ability to vault tapes to remote sites 527 and cost parameters 528, shown in FIG. 17. In this example, the retention policy is set to 10 full backups and there is no change in the default cost parameters. We also add a new site where tapes can be vaulted. In the catalogs window 404, we click and drag the "Boston Mass." site 432 from the catalogs window 404 to the sites box 412 in the main window 402, thereby creating a second site 418, shown in FIG. 18. Next, we go to the sites box 412 in the main window 402 and click once again on the "Central Office" 415 site, shown in FIG. 19. Then, we go to the workloads box 413 and click once again on the SQL workload 416. In the processes window 462, we click the checkbox for "Send to remote site" 527 and click on "Boston Mass." 418. In this way we have entered a policy to send all tapes to "Boston Mass." site 418 and the frequency 529 is set to be every 1 day, as shown in FIG. 19. The results of the second configuration are viewed by clicking on "existing+backup" 417 inside the configuration box 411 and then clicking on the report 425 button. A screen will pop up momentarily showing the results of this configuration, shown in FIG. 20. The expected costs of data loss 483 and downtime 484 have been significantly reduced by the backup policies. When examining the workloads, the RTO 486 and RPO 487 are now available based on the speed of the data restore.

Figure 20:
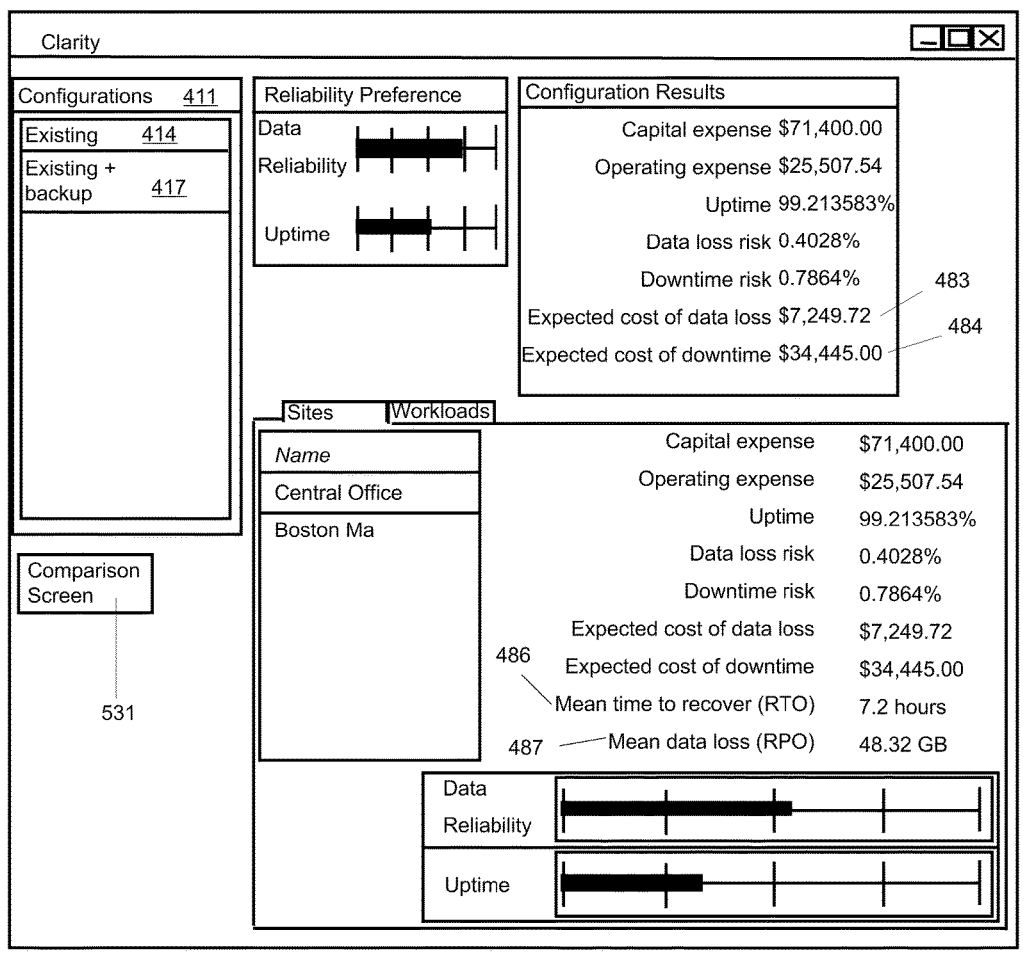
FIG. 20 is a screen diagram of the DR assessment and planning application depicting a the existing+backup configuration and its components.
Figure 21:
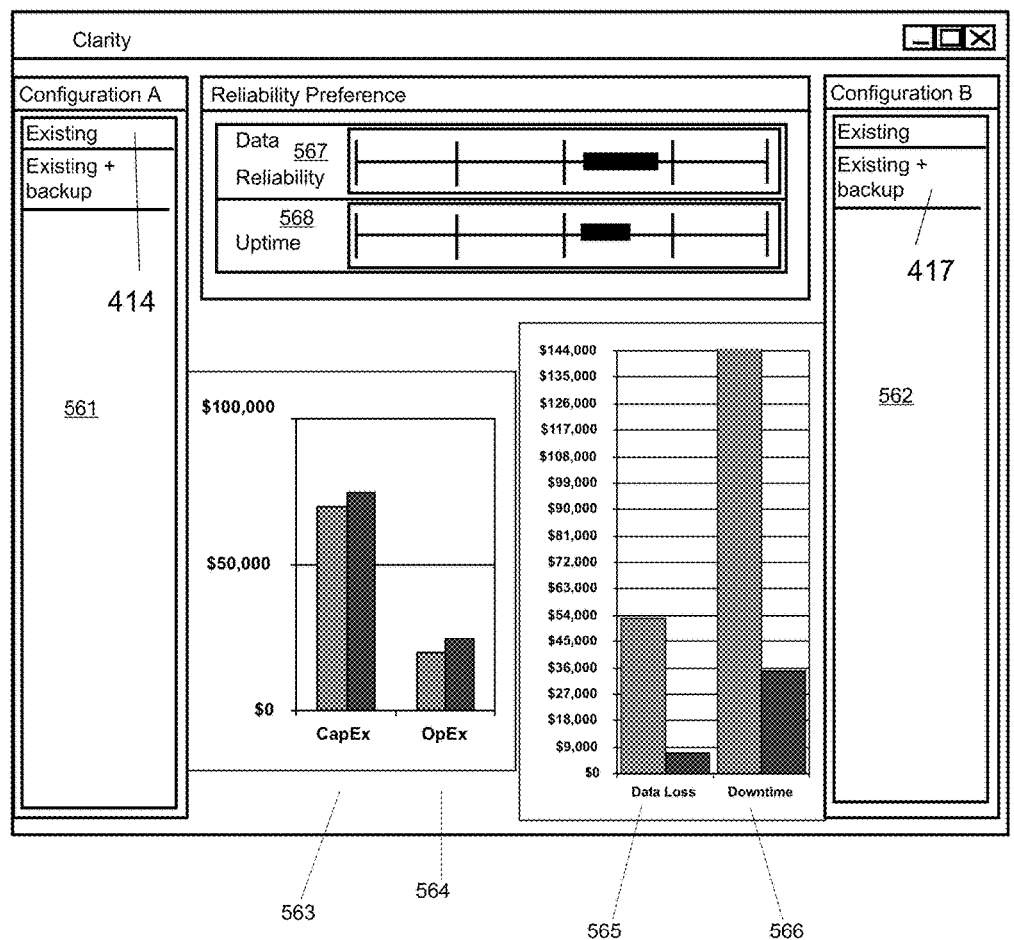
FIG. 21 is a screen diagram of the DR assessment and planning application depicting a graphical comparison of the existing configuration and the existing+backup configuration.

The two configurations, "existing" 414 and "existing+backup" 417 are compared by clicking the comparison screen button 531 on the report window 550, shown in FIG. 20. We click on "existing" 414 in the Configuration A box 561 and on "existing+backup" 417 in Configuration B box 562, shown in FIG. 21. A full graphical cost comparison between the two configurations is presented that includes capital costs 563, operating costs 564, annual cost of data loss 565 and annual cost of downtime 566. Data reliability 567 and uptime 568 meters indicate which configuration achieves better results.

Figure 22:
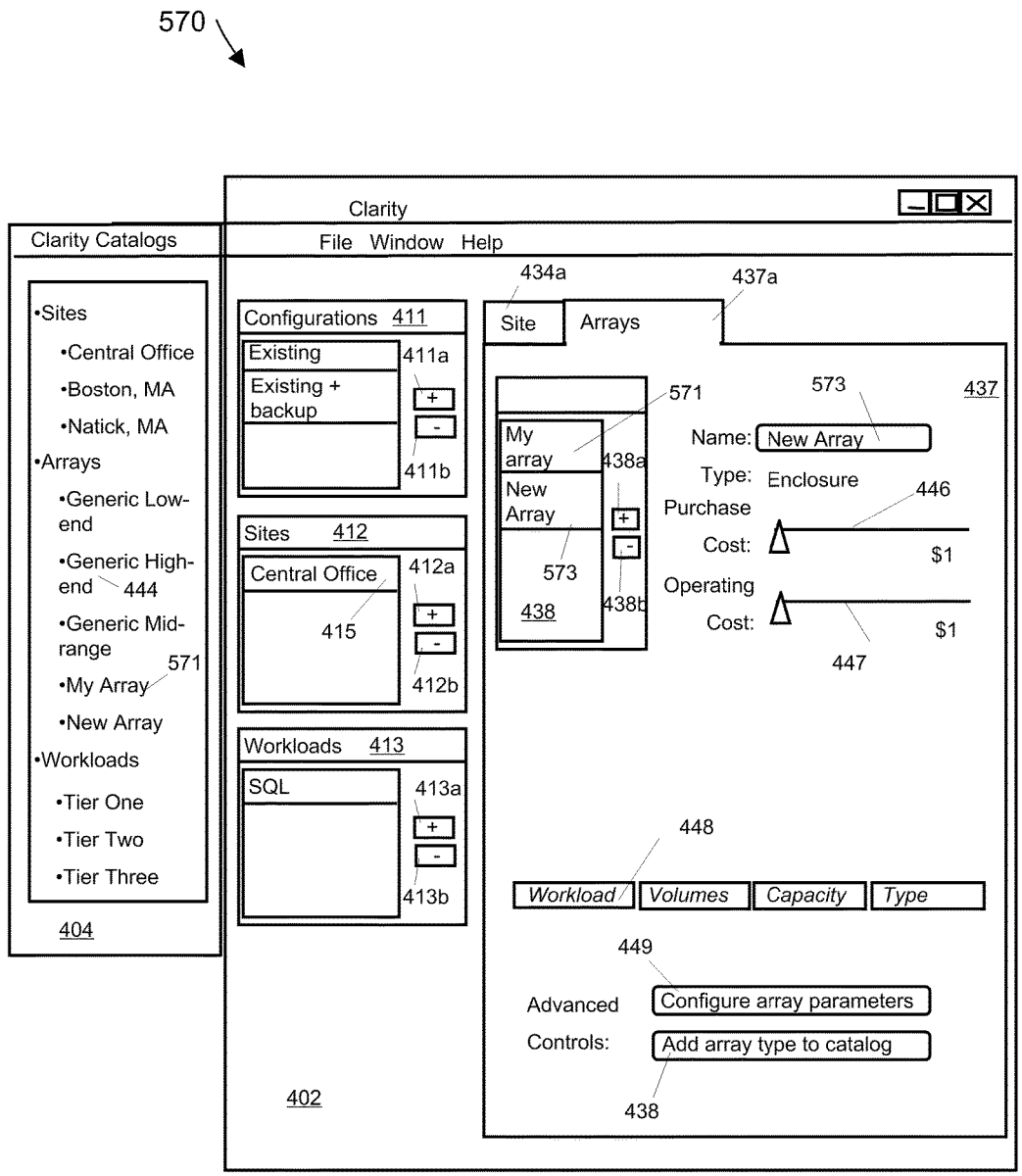
FIG. 22 is a screen diagram of the DR assessment and planning application depicting creating and adding a customized component to the catalog window.

Referring to FIG. 22, components are easily added to the catalog 404 so that they may be used in future assessment/planning sessions, without the need to re-enter them manually. There are two methods of creating components. The first method entails taking a customized component from the main window 402 and dragging it back to the catalog 404. The second method entails creating a new component using the (+) buttons 411a, 412a, 413a in the component boxes 411, 412, 413, respectively, in the main window 402. Components may also be removed via the (−) buttons 411b, 412b, 413b.

In the example of FIG. 22, a customized component is added by clicking on "Central office" 415 in the sites box 412 and then clicking on "Generic Mid-range 1" 481 in the Arrays box 438 under the Arrays tab 437a, shown in FIG. 9. Next, we rename the array to "My Array" 571, shown in FIG. 24, and then we use the mouse to drag "My Array" 571 from the Arrays box 438 to the catalogs window 404. Alternatively, we may click on the Add array type to catalog button 438. Right clicking on the "My Array" component 571 allows us to save the new component in the catalog 404. This added array may be used in future configurations using the drag and drop functionalities. At any time, the new component may also be deleted from the same menu. In the example of FIG. 22, a new component may be also created by clicking on the (+) button 438a in the Arrays box 438. This creates an array called "New Array" 573. Parameters may be set on the "New Array" 573 as desired by using the cost sliders 446, 447 and clicking the "Configure Array parameters" button 449. Once again this "New Array" may be dragged back into the product catalog 404. The same methodologies used to create new array components also applies to other components, such as sites, workloads and processes.

Several embodiments of the present invention have been described. Nevertheless, it will be understood that various modifications may be made without departing from the spirit and scope of the invention. Accordingly, other embodiments are within the scope of the following claims.

What is claimed is:

1. A computer implemented method for assessing and planning a change to an existing data disaster recovery (DR) comprising:

providing an application stored in memory and comprising instructions executable by a processor and wherein execution of said instructions by said processor causes said processor to perform operations comprising:

providing a graphical user interface (GUI) comprising first and second windows arranged adjacent to each other and wherein said first window comprises a catalog of components used to generate data disaster recovery (DR) configurations and said second window displays said generated DR configurations;

generating a first DR configuration in said second window, wherein the first DR configuration corresponds to a configuration for a physical DR site;

increasing a capacity of the first DR configuration by adding components to said first DR configuration by dragging and dropping components from said catalog into appropriate locations of said second window, so as to create a first expanded DR configuration;

calculating metrics for said first expanded DR configuration;

reporting and displaying said first expanded DR configuration metrics results in said second window;

generating a second DR configuration, based on the first expanded DR configuration in said second window, wherein the second DR configuration further comprises a backup process;

adding components to said second DR configuration by dragging and dropping components from said catalog into appropriate locations of said second window;

calculating metrics for said second DR configuration;

reporting and displaying said second DR configuration metrics results in said second window;

comparing said first and second DR configuration metrics results in said second window;

selecting an optimal configuration for first expanded DR configuration or second DR configuration based on a hierarchical ranking of one or more metrics.

2. The computer implemented method of claim 1 wherein said components comprise at least one of sites, arrays, workloads and processes.

3. A computer implemented method for assessing and planning a change to an existing data disaster recovery (DR) comprising:

providing an application stored in memory and comprising instructions executable by a processor and wherein execution of said instructions by said processor causes said processor to perform operations comprising:

providing a graphical user interface (GUI) comprising first and second windows arranged adjacent to each other and wherein said first window comprises a catalog of components used to generate data disaster recovery (DR) configurations and said second window displays said generated DR configurations;

generating a first DR configuration in said second window, wherein the first DR configuration corresponds to a configuration for a physical DR site;

adding components to said first DR configuration by dragging and dropping components from said catalog into appropriate locations of said second window, so as to create a first expanded DR site;

calculating metrics for said first expanded DR configuration; and reporting and displaying said first expanded DR configuration metrics results in said second window, wherein said metrics comprise one of capital expenses, annual operating expenses, time to recovery, expected annual cost of downtime, expected annual cost of data loss, data reliability and uptime, and wherein said method is performed as part of data storage system data recovery processing.

4. The computer implemented method of claim 1 wherein said metrics results are presented as graphics or text.

5. A system for assessing and planning data disaster recovery (DR) for an entity comprising:

a processor;

memory coupled to the processor;

an application stored in said memory and comprising instructions executed by said processor, and wherein said instructions comprise:

instructions for providing a graphical user interface comprising fust and second windows arranged adjacent to each other and wherein said first window comprises a catalog of components used to generate data disaster recovery (DR) configurations and said second window displays configurations;

said generated DR instructions for generating a first DR configuration in said second window, wherein the first DR configuration site corresponds to a configuration for a physical DR site;

instructions for increasing a capacity of the first DR configuration by adding components to said first DR configuration by dragging and dropping components from said catalog into appropriate locations of said second window, so as to create an expanded first DR configuration;

instructions for calculating metrics for said first expanded DR configuration;

instructions for reporting and displaying said first expanded DR configuration metrics results in said second window;

instructions for generating a second DR configuration, based on the first expanded DR configuration in said second window, wherein the second DR configuration further comprises a backup process;

instructions for adding components to said second DR configuration by dragging and dropping components from said catalog into appropriate locations of said second window;

instructions for calculating metrics for said second DR configuration;

instructions for reporting and displaying said second DR configuration metrics results in said second window;

instructions for comparing said first and second DR configuration metrics results in said second window, and wherein said instructions are executed as part of data storage system data recovery processing; and instructions for selecting an optimal configuration for first expanded DR configuration or second DR configuration based on a hierarchical ranking of one or more metrics.

6. The system of claim 5 wherein said components comprise at least one of sites, arrays, workloads and processes.

7. The system of claim 5 wherein said metrics comprise one of capital expenses, annual operating expenses, time to recovery, expected annual cost of downtime, expected annual cost of data loss, data reliability and uptime.

8. The system of claim 5 wherein said metrics results are presented as graphics or text.

9. The computer implemented method of claim 4 wherein each of said sites comprises configurable parameters for name, address, description, purchase cost, operating cost, average unscheduled downtime per year, disaster frequency, mean time between major disasters, and network reliability.

10. The computer implemented method of claim 4 wherein each of said arrays comprises configurable parameters for name, purchase cost, operating cost, volumes, capacity, storage type, ratings and processes.

11. The computer implemented method of claim 4 wherein each of said workloads comprises configurable parameters for name, restart time, recovery time, update rate, data value, volumes, cost of downtime, and processes.

12. The computer implemented method of claim 4 wherein each of said processes comprises configurable parameters for name, data backup type, data backup frequency, operating cost, purchase cost, buffer size, mirror type, space efficiency and data backup policies.

13. The computer implemented method of claim 12 further comprising adding a new a component to said catalog by transferring a component configured in any of said DR configurations from said second window to said first window.

\* \* \* \* \*